United States Patent [19]

Theuninck et al.

[11] Patent Number: 5,952,024
[45] Date of Patent: Sep. 14, 1999

[54] ANIMAL FEED SUSPENSION WITH INCREASED PHOSPHOROUS CONTENT AND METHOD FOR MAKING SAME

[75] Inventors: Duane Theuninck; Debra Anderson, both of Minnetonka; Sandra R. Ecker, Anoka, all of Minn.

[73] Assignee: Cargill Incorporated, Minneapolis, Mass.

[21] Appl. No.: 08/904,356

[22] Filed: Aug. 1, 1997

Related U.S. Application Data

[63] Continuation of application No. 08/776,824, filed as application No. PCT/US95/08760, Jul. 13, 1995, abandoned.

[51] Int. Cl.$^6$ ........................................... A23K 1/00
[52] U.S. Cl. .................................... 426/72; 426/2
[58] Field of Search ............................................. 426/74, 2

[56] References Cited

U.S. PATENT DOCUMENTS 4,937,082   6/1990   Sauhill ...................................... 426/74
4,963,371  10/1990   Miller ....................................... 426/74

*Primary Examiner*—Carolyn Paden
*Attorney, Agent, or Firm*—Fitch, Even, Tabin & Flannery

[57] ABSTRACT

The invention provides a stable liquid feed comprising a phosphorous content of at least about 3 weight percent and a method for obtaining such feed supplements. The liquid feed suspension is stable over a wide temperature and pH range and is effective for suspending up to 40 weight percent undissolved solids.

12 Claims, No Drawings

ANIMAL FEED SUSPENSION WITH INCREASED PHOSPHOROUS CONTENT AND METHOD FOR MAKING SAME

This application is a continuation application of Ser. No. 08/776,824 filed Jan. 21, 1997 now abandoned, which is the National Stage of International Application No. PCT/US95/08760, filed Jul. 13, 1995.

BACKGROUND OF THE INVENTION

This invention relates to animal feed suspensions which are liquid feed supplements and which have a phosphorus content of at least 3 weight percent phosphorus, and a method for obtaining such feed supplements. More particularly, this invention relates to a liquid animal feed supplement that delivers high amounts of dietary phosphorus, remains a stable liquid suspension over a broad pH and temperature range, is effective for delivering nutrients such as protein, carbohydrates, vitamins, minerals and/or fat to the animal, and is particularly suited for swine.

Liquid feeds for domesticated animals, particularly ruminants such as beef and dairy cattle and sheep have been widely used commercially. These ruminant feeds typically use liquid phosphorous sources such as ammonium polyphosphate and phosphoric acid. Thixotropic liquid suspensions include undissolved solids such as calcium carbonate. However, liquid feeds have not been widely used for monogastric animals, such as swine, because in prior formulations, levels of minerals, particularly calcium and phosphorous, that could be included in stable liquid feeds were limited relative to nutrient levels required in the diet. Liquid feeds are advantageous in that they provide dust control and ease of handling. A stable liquid feed with a high phosphorus content capable of suspending insoluble minerals needed in the diets of most animals has heretofore not been available because a feed high in phosphorus has also been too viscous, or even solid within broad temperature and pH ranges. These broad ranges are often required for commercial liquid feeds and feed supplements. This is especially the case for feeds and feed supplements which are capable of suspending at least about 40 weight percent undissolved solids.

OBJECTS OF THE INVENTION

An object of the invention is to provide a stable liquid feed suspension which has a high phosphorus content.

Another object of the invention is to provide a liquid feed suspension which is stable over a wide temperature and pH range which is effective for suspending up to 40 weight percent undissolved solids.

Yet another object of the invention is to provide an animal feed or feed supplement which has a high phosphorous content, but is stable over broad temperature and pH ranges.

These and other objects of the invention will become apparent with reference to the following description of the invention.

SUMMARY OF THE INVENTION

The invention provides a stable liquid feed comprising a phosphorus content of at least about 3 weight percent, based upon the weight of the feed, a suspending agent, the liquid feed having a viscosity of from about 1000 cps to about 10,000 cps within a temperature range of from about 65° F. to about 80° F. The phosphorus in the liquid feed of the invention is in the form of dibasic and/or tribasic orthophosphates for the phosphorus in the feed in excess of 2.5 weight percent. In accordance with the invention, liquid carriers, such as water and corn steep liquor, suspending agent(s) and phosphates selected from the group consisting of dibasic orthophosphates, tribasic orthophosphates and mixtures thereof are mixed in effective amounts to provide a stable feed having the aforedescribed viscosity and the ability to suspend up to 40 weight percent undissolved solids over a pH range of from about 5 to about 9. All of the phosphorus in the liquid feed may be in di or tribasic form, but not more than about 2.5 weight percent of the phosphorus in the liquid feed may be a source of phosphorus which is not in a di or tribasic form.

In an important aspect of the invention, the liquid feed has a viscosity of from about 1000 to about 10,000 cps and the aforedescribed temperature range and comprises from about 20.0 to about 60.0 weight percent liquid carriers, from about 0.10 to about 2.0 weight percent suspending agent, from about 3.0 to about 12.0 weight percent phosphorus, the phosphorus in the feed being supplied by at least about 0.5 weight percent dibasic and/or tribasic orthophosphate. Desirably, the liquid feed includes from about 1.0 to about 30 weight percent carbohydrates and further includes a soluble salt such as sodium chloride in an amount which serves to activate the clay to enhance its suspending ability.

DESCRIPTION OF THE PREFERRED EMBODIMENTS OF THE INVENTION

In this specification, "dibasic orthophosphate" means a phosphate where two protons on $H_3PO_4$ have been substituted with monovalent or divalent cations, as for example, dicalcium phosphate ($CaHPO_4 \cdot 2H_2O$), disodium hydrogen phosphate ($Na_2HPO_4$) and ammonium mono hydrogen orthophosphate ($(NH_4)_2HPO_4$).

"Tribasic orthophosphate" means a phosphate where three protons on $H_3PO_4$ have been substituted with monovalent or divalent cations, as for example tricalcium phosphate [$Ca_3(PO_4)_2$].

"Clay" means a plastic mixture of silica and alumina which may be silicate mineral which hardens when heated and which in powdered form is an effective suspending agent. Effective clays include but are not limited to attapulgite and sepiolite.

"Gum" means a polysaccharide material of plant origin which forms colloidal gels in water. Gums include but are not limited to xanthan gum and carrageenan gum.

"Liquid carrier" means any substance that provides the necessary amount of water to the resulting product. It includes, but is not limited to water or a nutritive liquid.

By balancing effective amounts of liquid carrier, a suspending agent and dibasic and tribasic orthophosphate with other forms of dietary phosphorus, the invention provides a stable liquid feed having a viscosity of from about 1000 cps to about 10,000 cps within a temperature range of from about 65° F. to about 80° F. Liquid carrier, a suspending agent comprising clay, gum and mixtures thereof, and a phosphate selected from the group consisting of dibasic orthophosphates, tribasic orthophosphates and mixtures thereof are mixed in effective amounts to provide the stable liquid feed having the aforedescribed viscosity and the ability to suspend up to 40 weight percent undissolved solids over a pH range of from about 5 to about 9. All of the phosphorus in the liquid feed may be in a di or tribasic form. If all of the phosphorous is not in such form, not more than about 2.5 percent of the phosphorous in the liquid feed is from a source of phosphorous which is not a di- or tribasic orthophosphate. The latter phosphates include phosphoric acid, and polyphosphates such as ammonium polyphosphate and monobasic orthophosphates.

For a balanced diet, the liquid feed may also include carbohydrates, fat, vitamins, minerals, proteins and non-nutritive materials. However, sources of calcium and magnesium ions may serve as hardeners in feed blocked technology and may increase the viscosity of the feed more than is desired. Hence, if the feed includes these sources of calcium and magnesium, the amounts must be balanced in amounts effective to avoid hardening the liquid feed into a solid form or raising the viscosity of the feed above the desired limits as described above.

The liquid feed of this invention may contain ingredients including suspended solids such as carbonates, oxides, proteins and undissolved dietary salts; fats such as animal fats, vegetable oils and soapstocks; dissolved solids such as chlorides, sulfates, hydroxides, acids and urea.

Further, soluble salts may be included as nutrient sources, to enhance the suspending ability of the clay and/or to provide stability against freezing.

The Dibasic and Tribasic Orthophosphate Source

The sources for dibasic and tribasic orthophosphate include but are not limited to dicalcium phosphate ($CaHPO_4.2H_2O$), dimagnesium phosphate ($MgHPO_4.2H_2O$), disodium hydrogen phosphate ($Na_2HPO_4$), dipotassium phosphate ($K_2HPO_4$) and ammonium mono hydrogen orthophosphate $(NH_4)_2HPO_4$.

The sources for tribasic orthophosphate include but are not limited to $Ca_3(PO_4)_2$ and $Mg_3(PO_4)_2$.

While not intending to be bound by any theory, any phosphate source which converts into di or tribasic orthophosphorus within the pH range of from about 5 to about 9 will be an acceptable source for phosphorus.

The Non Di and Tribasic OrthoPhosphate Source

As indicated, phosphorous not in di or tribasic orthophosphate form may provide up to about 2.5 weight percent phosphorous in the liquid feed.

Any phosphorus source which is suitable for an animal's diet that does not convert into a di or tribasic orthophosphate within the pH range of from about 5 to about 9 is suitable for use in the liquid feed of the invention. These phosphorus sources include polyphosphates such as ammonium polyphosphate, phosphoric acid and monobasic orthophosphates which tend to unduly thicken or gel are included in this type of phosphorus which is non di or tribasic phosphorus. For swine feed, the dibasic phosphorus source is preferably dicalcium phosphate.

It is important that the phosphorous sources do not cause the liquid feed to thicken outside the indicated viscosity range and that these sources provide higher levels particularly for monogastric animals.

The Carbohydrate Source

Sources of carbohydrates in the feed may include sugars such as sucrose and glucose, and nutritive liquids such as, beet and cane molasses, condensed beet solubles, and corn steep liquor. The carbohydrate source comprises from about 1 to about 60 weight percent of the liquid feed. In an important aspect of the invention, the carbohydrate source is a blend of corn steep liquor and condensed beet solubles. In this connection corn steep liquor means, condensed fermented corn extractives and condensed beet solubles means desugared beet molasses. In another aspect of the invention, the carbohydrate source is 80 Brix cane molasses.

The carbohydrate provides nutritive value to the liquid feed but is not necessarily required.

The Suspending Agent

Suitable suspending agents include, but are not limited to, clays such as sepiolite and attapulgite gums such as xanthan gum, carrageenan gum and guar gum, and starches such as gelatinized starch. The amount of suspending agent in the feed is from about 0.1 to about 2.0 weight percent, based upon the weight of the feed, preferably from about 0.1 to about 0.4 for gum and from about 0.25 to about 2 for clay. In an important aspect of the invention the suspending agent is attapulgite or sepiolite clay.

The Soluble Salts

As above indicated, soluble salts can serve as nutrient sources, as well as to enhance the suspending ability of the clays and/or serve to enhance freeze stability of the liquid feed. Examples of soluble salts useful for this invention are sodium chloride, sodium sulfate, potassium chloride and magnesium chloride.

Optional Insoluble Ingredients

Insoluble ingredients including carbonates such as calcium carbonate, oxides such as magnesium oxide prills, proteins and undissolved dietary salts may be added to the liquid feed in amounts ranging from about 0 to about 40 weight percent of the liquid feed. In an important aspect of the invention, the liquid feed of the invention has the ability to provide a suspension of insoluble solids of at least 10 weight percent up to about 40 weight percent of the liquid feed over a broad temperature range of about 5° F. to about 90° F.

Particle Size

The insoluble materials have a particle size of less than U.S. #10 screen size and generally 100 percent pass through U.S. #40 screen size.

Optional Fat Source

The fat source includes, but is not limited to fat such as tallow, grease, soapstock oils and vegetable oils and mixtures thereof. Generally up to and including about 30 weight fat may be included in the liquid feed of the invention. If fat is used, however, the fat may effect the viscosity of the composition, and as a result, the other ingredients may have to be controlled to provided the viscosity of the liquid feed as described herein.

Optional Nitrogen Source

Sources for dietary nitrogen include ammonium polyphosphate, urea, oilseed meals, animal protein products and synthetic amino acid.

pH Control Ingredients

The pH of the liquid feed should be maintained between from about 5 to about 9. This control may be retained with acids and bases such as but not limited to phosphoric acid, sulfuric acid, sodium hydroxide and magnesium oxide. However, with certain ingredients, the pH may be adjusted to above 5 to avoid foaming of carbonates.

Viscosity

The liquid feed is thixotropic and has a viscosity within the indicated range of about 1,000 to about 10,000 cps at about 65° F. to about 80° F. This viscosity, for commercial purposes, should be retained for a period of at least 12 weeks over a storage temperature range of 5° F. to 90° F. and, if the liquid feed sets up, it can be agitated to convert it to liquid form due to its thixotropic properties.

Making the Liquid Feed of the Invention

| Ingredient/s (in order of addition) | pH range of mixture | Comments |
|---|---|---|
| Water | 5–7 | |
| Clay or | 8–9 | The pH of this system is that of the suspending material |
| Gum | 5–7 | The pH of this system is that of the suspending material |
| Nutritive Liquid (e.g., molasses (cane/beet), corn steep liquor, condensed fermented corn extractive, condensed beet solubles | 4–10 | The pH reflects the nutritive liquid/s |
| Soluble salts (e.g., NaCl, ammonium sulfate, KCl, etc.) | 4–10 | |
| pH control ingredients, oxides, hydroxides, acids | 5.8–9 | This is the step in manufacture to add acidic or basic ingredients to achieve the desired final pH range. |
| Phosphate addition | 5–9 | |
| Calcium Carbonate, if added | 5–9 | The pH must be over 5.8 to prevent carbonate foaming. |
| Ammonium polyphosphate (if added) | 5–9 | A downward shift of approximately .5 pH units is seen if the pH of the product is ≧5.5. This is the reason the range of 5.8–9 is given for the pH control ingredients. |

Commercial Formulations of the Invention

| Dicalcium phosphate dihydrate | 24.049 | 24.058 |
|---|---|---|
| Water | 18.017 | 19.468 |
| Beet solubles | 11.399 | 7.126 |
| Limestone (CaCO₃) | 10.968 | 10.964 |
| Corn Steep | 10.000 | 10.000 |
| Fat | 9.805 | 9.870 |
| Salt | 6.500 | 6.500 |
| Clay 25% | 4.000 | 4.000 |
| Trace nutrients | 1.876 | 4.626 |
| MgO | 0.300 | 0.300 |
| Flavor | 0.050 | 0.050 |
| Ethoxyquin | 0.013 | 0.013 |
| Disodium phosphate | 0.013 | 0.013 |
| Tricalcium phosphate | 0.013 | 0.013 |
| Ammonium polyphosphate | 3.000 | 3.000 |
| | 100.003 | 100.001 |
| pH | 5.8–6.2 | 5.8–6.2 |
| Viscosity | 1600–3000 | 1600–3000 |
| Dry matter | 68% | 68% |
| Phosphorous | 5% | 5% |

Laboratory Formulas with Cane Molasses as Primary Carrier

| | | | | |
|---|---|---|---|---|
| Water | 18.39 | 18.24 | 15.00 | 20.79 |
| Clay 25% | 2.00 | 2.00 | 2.00 | 2.00 |
| Cane 79.5 | 31.57 | 32.07 | 43.76 | 31.94 |
| Salt | 6.50 | 6.50 | 6.50 | 6.50 |
| MgO | 1.00 | | 1.00 | |
| NaOH | | 3.70 | | |
| Limestone (CaCO₃) | 11.85 | 10.80 | 2.49 | 12.11 |
| Dicalcium phosphate dihydrate | 22.29 | 23.69 | | 22.08 |
| Tricalcium phosphate | | | 22.74 | |
| Disodium phosphate | | | | 4.59 |
| Ammonium polyphosphate | 6.50 | | 6.50 | |
| Phosphoric acid | | 3.00 | | |
| | 100.00 | 100.00 | 99.99 | 100.01 |
| Phosphorus | 5.00 | 5.00 | 5.00 | 5.00 |
| pH 24 hour | 7.00 | 6.41 | 6.64 | 6.11 |
| 1 week | 6.59 | 6.58 | 8.40 | 6.32 |
| Viscosity 24 hour | 2505 | 2950 | 5700 | 1475 |
| 1 week | 3050 | 2350 | 7500 | 1350 |

What is claimed is:

1. A stable liquid animal feed comprising a dibasic or tribasic orthophosphate source or mixtures thereof, liquid carrier, a suspending agent, the liquid feed having a viscosity of from about 1000 cps to about 10,000 cps measured within a temperature range of between about 65° F. and about 80° F., the liquid carrier, the suspending agent and the phosphates, being mixed in effective amounts to provide the stable liquid feed with a phosphorous content of at least about 3 weight percent, based upon the weight of the feed, the phosphorous in the feed being supplied by at least about 0.5 weight percent of a polybasic phosphate selected from the group consisting of a dibasic orthophosphate, a tribasic orthophosphate and mixtures thereof, and not more than about 2.5 weight percent of the phosphorous in the feed being supplied by a phosphate source which is not the dibasic orthophosphate or the tribasic orthophosphate, the liquid carrier, the suspending agent, the polybasic phosphate and the phosphates which are not polybasic being balanced to achieve a phosphorous content of at least 3 weight percent and to keep the feed liquid, said viscosity and the liquid feed being effective for suspending up to 40 weight percent undissolved solids over a pH range of from about 5 to about 9.

2. A stable liquid feed as recited in claim 1 wherein the liquid feed is stable in the temperature range of about 5° F. to about 90° F.

3. A stable liquid feed as recited in claim 1, further including sources of carbohydrates comprising molasses, corn steep, condensed beet solubles and mixtures thereof.

4. A stable liquid feed as recited in claim 1 and further including a soluble salt.

5. A stable liquid feed as recited in claim 1, further comprising carbohydrates, fats, vitamins, minerals, proteins or non-nutritive materials.

6. A stable thixotropic liquid animal feed comprising from about 20.0 to about 60.0 weight percent liquid carrier, from about 0.10 to about 2.0 weight percent suspending agent, from about 3.0 to about 12.0 weight percent phosphorous, from about 1.0 to about 30 weight percent carbohydrate, the phosphorus in the feed being supplied by at least 0.5 weight percent of a polybasic phosphate selected from the group consisting of a dibasic orthophosphate, a tribasic orthophosphate and mixtures thereof, and not more than about 2.5 weight percent of the phosphorous in the feed being supplied by a phosphate source which is not the dibasic orthophosphate or the tribasic orthophosphate, the liquid carrier, the suspending agent, the polybasic phosphate and the phosphates which are not polybasic being balanced to achieve a phosphorous content of at least 3 weight percent and to keep the feed liquid, the liquid feed having a viscosity of from about 1000 cps to about 10,000 cps over a temperature range of from about 65° F. to about 80° F.

7. A stable liquid feed as recited in claim 6 wherein the liquid feed is stable in the temperature range of about 5° F. to about 90° F.

8. A stable liquid feed as recited in claim 6 wherein the sources of carbohydrate comprises molasses, corn steep, condensed beet solubles and mixtures thereof.

9. A stable liquid feed as recited in claim 6 wherein the insoluble ingredients have a mesh size less than a U.S. #10 screen.

10. A method of preparing a stable liquid feed comprising the steps of providing liquid carrier in the amount of about 20.0 to about 60.0 weight percent, adding and mixing from about 0.10 to about 2.0 weight percent of a suspending agent, adding phosphates at a level of 3.0 to 12.0 weight percent with dibasic or tribasic phosphates included at a level of from 0.5 to 12 weight percent and other phosphates at a level of less than 2.5 weight percent, and mixing the ingredients to provide a viscosity of about 1000 cps to about 10,000 cps.

11. A method as recited in claim 10 wherein a soluble salt is added after addition of the suspending agent.

12. A method as recited in claim 10 wherein the sources of carbohydrate comprises molasses, corn steep liquor, condensed beet solubles and mixtures thereof.

* * * * *